United States Patent
DeCusatis et al.

(10) Patent No.: US 9,253,028 B2
(45) Date of Patent: Feb. 2, 2016

(54) SOFTWARE-DEFINED NETWORKING TUNNELING EXTENSIONS

(71) Applicant: International Business Machines Corporation, Armonk, NY (US)

(72) Inventors: Casimer M. DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 14/105,226

(22) Filed: Dec. 13, 2013

(65) Prior Publication Data

US 2015/0172103 A1    Jun. 18, 2015

(51) Int. Cl.
*H04L 12/28* (2006.01)
*H04L 12/24* (2006.01)
*H04L 12/701* (2013.01)

(52) U.S. Cl.
CPC ........ *H04L 41/0681* (2013.01); *H04L 41/0686* (2013.01); *H04L 45/00* (2013.01)

(58) Field of Classification Search
USPC .......... 370/389; 710/313, 316, 317, 105, 114, 710/3, 314
See application file for complete search history.

(56) References Cited

U.S. PATENT DOCUMENTS

| 7,340,535 | B1 | 3/2008 | Alam | |
|---|---|---|---|---|
| 2011/0182259 | A1 | 7/2011 | Perkins et al. | |
| 2012/0063451 | A1* | 3/2012 | Keesara et al. | 370/389 |
| 2013/0034094 | A1 | 2/2013 | Cardona et al. | |
| 2013/0254453 | A1* | 9/2013 | Sato et al. | 710/317 |
| 2014/0059265 | A1* | 2/2014 | Iyer et al. | 710/313 |

\* cited by examiner

*Primary Examiner* — Phuongchau Ba Nguyen
(74) *Attorney, Agent, or Firm* — Cantor Colburn LLP; Steven Chiu

(57) ABSTRACT

An aspect includes receiving, at a software-defined networking (SDN) controller, a request from a requestor to identify a flow of a data packet in a computer network. The data packet includes a data packet header. It is determined, based on the data packet header, that the data packet includes one of a peripheral component internet express (PCIe) data packet and a multi-root input/output (MR-IOV) data packet. It is also determined that the flow of the data packet requires a virtual tunnel between a source network device and a destination network device. The creation of the virtual tunnel is initiated and the requestor is instructed to send the packet from the source network device to the destination network device via the virtual tunnel. The requestor is also instructed to use the virtual tunnel for sending subsequent packets having the same flow and received prior to the virtual tunnel being shut down.

20 Claims, 5 Drawing Sheets

SOFTWARE-DEFINED NETWORKING TUNNELING EXTENSIONS

BACKGROUND

The present invention relates generally to software-defined networking (SDN), and more specifically, to SDN tunneling extensions.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, fibre channel over Ethernet (FCoE), Internet wide area remote direct memory access protocol (iWARP), remote direct memory access over converged Ethernet (RoCE).

In traditional network architectures there is no centralized network control. Routing tables located locally in network devices, such as switches, bridges, gateways, routers, or firewalls, are individually configured to direct network traffic to neighboring nodes of the network. The network devices may make control decisions and forward network traffic accordingly. In software-defined networking (SDN), network traffic routing decisions are centrally controlled and made by a controller that creates tables to define flow paths through the network. The controller decouples control decisions about where traffic is sent from network devices that forward traffic to a selected destination.

SUMMARY

Embodiments include methods, systems, and computer program products for software-defined networking (SDN). A method includes receiving, at a SDN controller in a computer network, a request from a requestor to identify a flow of a data packet from a source network device to a destination network device in the computer network. The data packet includes a data packet header. It is determined, based on the data packet header, that the data packet includes one of a peripheral component internet express (PCIe) data packet and a multi-root input/output (MR-IOV) data packet. It is also determined, based on the data packet header, that the flow of the data packet requires a virtual tunnel between the source network device and the destination network device. The creation of the virtual tunnel is initiated and the requestor is instructed to send the packet from the source network device to the destination network device via the virtual tunnel. The requestor is also instructed to use the virtual tunnel for sending subsequent packets having the same flow and received prior to the virtual tunnel being shut down.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Exemplary embodiments relate to computer networks that use a tunneling protocol to create a virtual tunnel in order to carry a payload over an incompatible delivery-network. In exemplary embodiments, Ethernet switches are controlled with a software-defined networking (SDN) controller that recognizes attributes of peripheral component interconnect express (PCIe) and multi-root I/O virtualization (MR-IOV) packets. The SDN controller routes the flows of the identified PCIe and MR-IOV packets via virtual tunnels. This allows for control of additional types of traffic from a common network controller, as well as the management of different formats of traffic exchanges between the different formats of physical and virtual networks Exemplary embodiments relate to providing support for PCIe to converged enhanced Ethernet (CEE) tunneling in SDN controllers. A SDN controller can control different types of traffic flow, such as Internet protocol (IP) traffic and fibre channel traffic between servers and networks that are connected by switches within a data center, without requiring packet encapsulation. Networks can include, but are not limited to local area networks (LANs) and storage area networks (SANs). The different traffic types may flow across a PCIe tree having multiple end point processors connected, via switches, to a root complex and across a CEE domain in which multiple traffic flows are permitted on a single physical switch port. In an embodiment, the SDN controller recognizes PCIe packet headers as well as CEE headers and routes packets to CEE switch ports based on the PCIe header attributes. The SDN controller can implement traffic routing specific to the PCIe protocol to insure compatibility with the PCIe architecture.

In embodiments, the SDN controller is capable of recognizing and routing traffic in a MR-IOV overlay network that manages an input/output (I/O) hierarchy of resources using a multi-root manager connected to the SDN controller based on the overlay extension. The SDN controller can control traffic routing specific to the MR-IOV overlays. The SDN controller can also manage packet exchange between PCIe, CEE and MR-IOV formats (both physical and virtual networks) as part of its flow control and protocol specific routing patterns.

Figure 1:
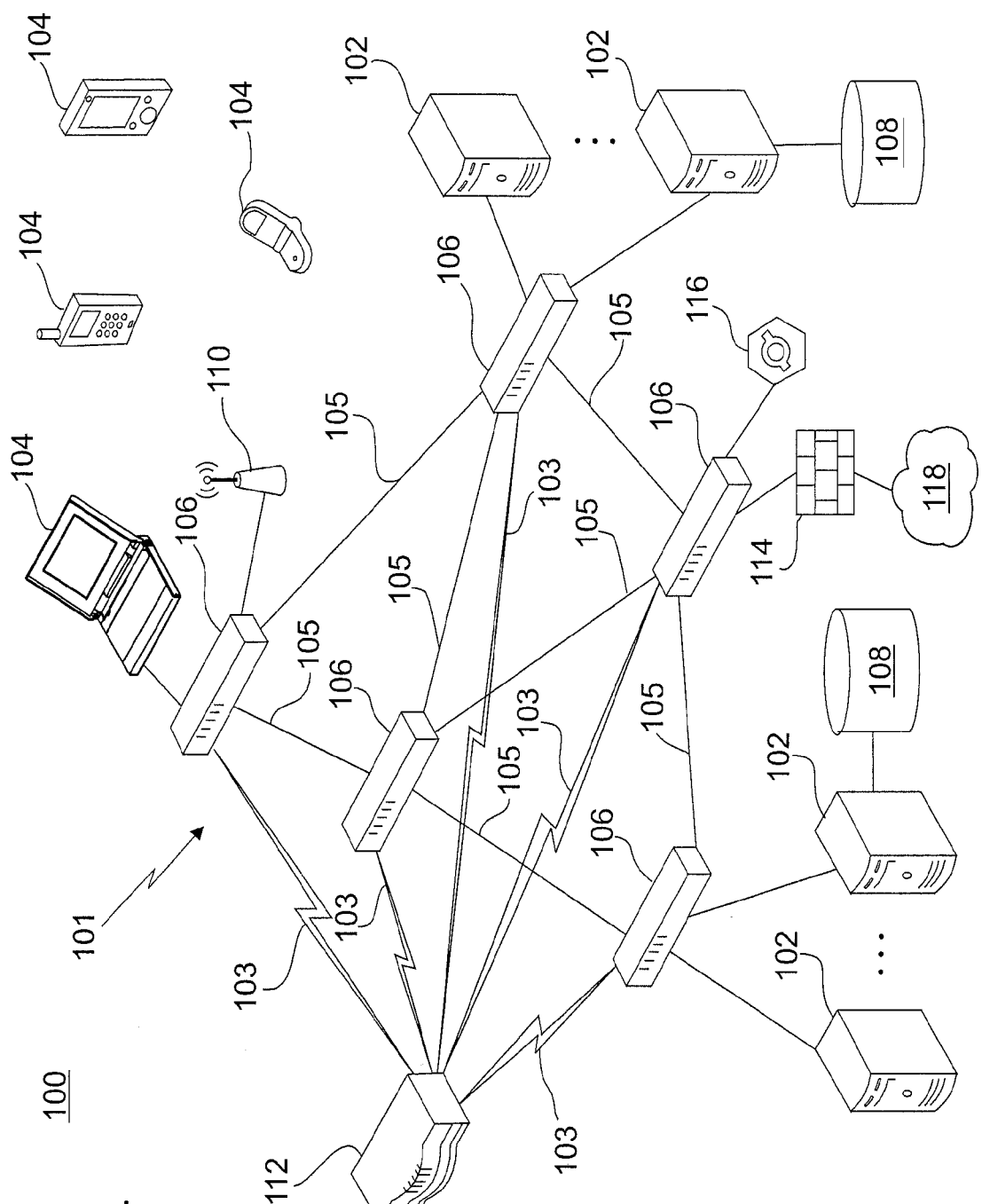
FIG. 1 depicts a system that includes computer network for implementing software-defined networking (SDN) in accordance with an embodiment.

Turning now to FIG. 1, an example of a system 100 including a network 101 that supports software-defined networking (SDN) will now be described in greater detail. In the example depicted in FIG. 1, the system 100 is a system that includes a plurality of servers 102 and client systems 104 configured to communicate over the network 101 using switches 106 that are SDN-capable (e.g., OpenFlow-compatible). The network 101 may be an enterprise network that is geographically distributed between multiple physical locations or it may be a datacenter network that contained in a single geographic location. In an embodiment, the system 100 is in a datacenter environment. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. One or more of the servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may comprise one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by one or more of the servers 102, which can be distributed in various locations of the system 100.

The system 100 also includes an SDN controller 112 that is a central SDN controller configured to make routing decisions within the network 101. The SDN controller 112 establishes one or more secure links 103 to configure the switches 106 and communication properties of links 105 between the switches 106. For example, the SDN controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102. The SDN controller 112 can also configure the switches 106 to define tunnels between the servers 102 or switches 106.

The servers 102, client systems 104, and SDN controller 112 can include various computer/communication hardware and software technology known in the art, such as one or more processing units or circuits, volatile and non-volatile memory including removable media, power supplies, network interfaces, support circuitry, operating systems, and the like. Although the SDN controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. For example, each of the links 105 depicted in the network 101 can include more than one physical link. Embodiments of the network 101 can include numerous switches 106 (e.g., hundreds) with dozens of ports and links per switch 106. The switches 106 are also referred to generally as network resources and may represent any type of device that is capable of forwarding data through one or more ports. The network 101 may support a variety of known communication standards that allow data to be transmitted between the servers 102, client systems 104, switches 106, SDN controller 112, firewalls(s) 114, and/or load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports SDN as a layer-2 protocol. The switches 106 can be dedicated SDN switches or SDN-enabled general purpose switches that also support layer-2 and layer-3 Ethernet. In an exemplary embodiment, one of the servers 102 is operable to configure the SDN controller 112.

Figure 2:
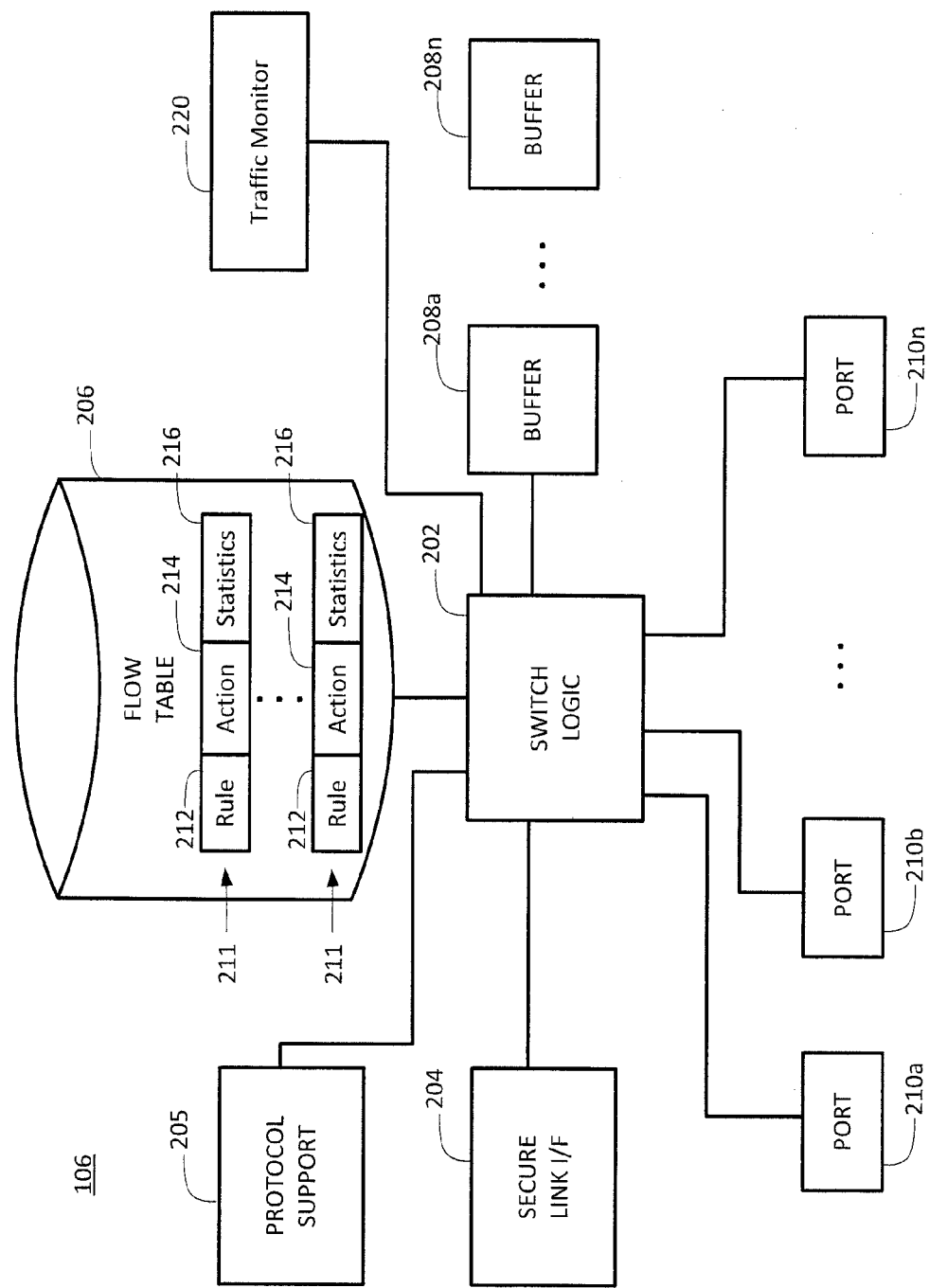
FIG. 2 depicts a block diagram of a switch of the system of FIG. 1 according to an embodiment.

FIG. 2 depicts a block diagram of the switch 106 of FIG. 1 that supports SDN. The switch 106 includes switch logic 202, secure link interface 204, protocol support 205, flow table 206, buffers 208a-208n, and ports 210a-210n. The switch 106 can also include traffic monitor 220 to monitor network traffic locally to determine network traffic performance metrics and provide the network traffic performance metrics to the SDN controller 112 of FIG. 1. The switch logic 202 may be implemented in one or more processing circuits, where a computer readable storage medium is configured to hold instructions for the switch logic 202 and/or the traffic monitor 220, as well as various variables and constants to support operation of the switch 106. The switch logic 202 forwards network traffic (e.g., packets) between the ports 210a-210n as flows defined by the SDN controller 112 of FIG. 1.

The secure link interface 204 connects the switch 106 to the SDN controller 112 via a secure link 103 of FIG. 1. The secure link interface 204 allows commands and packets to be communicated between the SDN controller 112 and the switch 106 using an SDN protocol. The secure link interface 204 can be controlled by executable instructions stored within the switch 106. Protocol details to establish a protocol definition for an implementation of SDN and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide SDN as an enhancement to existing conventional routers or switches.

The flow table 206 defines supported connection types associated with particular addresses, virtual local area networks or switch ports, for example. A flow may be defined as all network traffic that matches a particular header format, including use of wildcards. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the SDN controller 112 of FIG. 1, and dropping packets of the flow. Entries 211 in the flow table 206 can be added and removed by the SDN controller 112 of FIG. 1 via the secure link interface 204. The SDN controller 112 of FIG. 1 can pre-populate the entries 211 in the flow table 206. Additionally, the switch 106 can request creation of an entry 211 from the SDN controller 112 upon receiving a flow without a corresponding entry 211 in the flow table 206.

The buffers 208a-208n provide temporary storage in queues for flows as network traffic is sent between the ports 210a-210n. In a lossless configuration, rather than dropping packets of network traffic when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
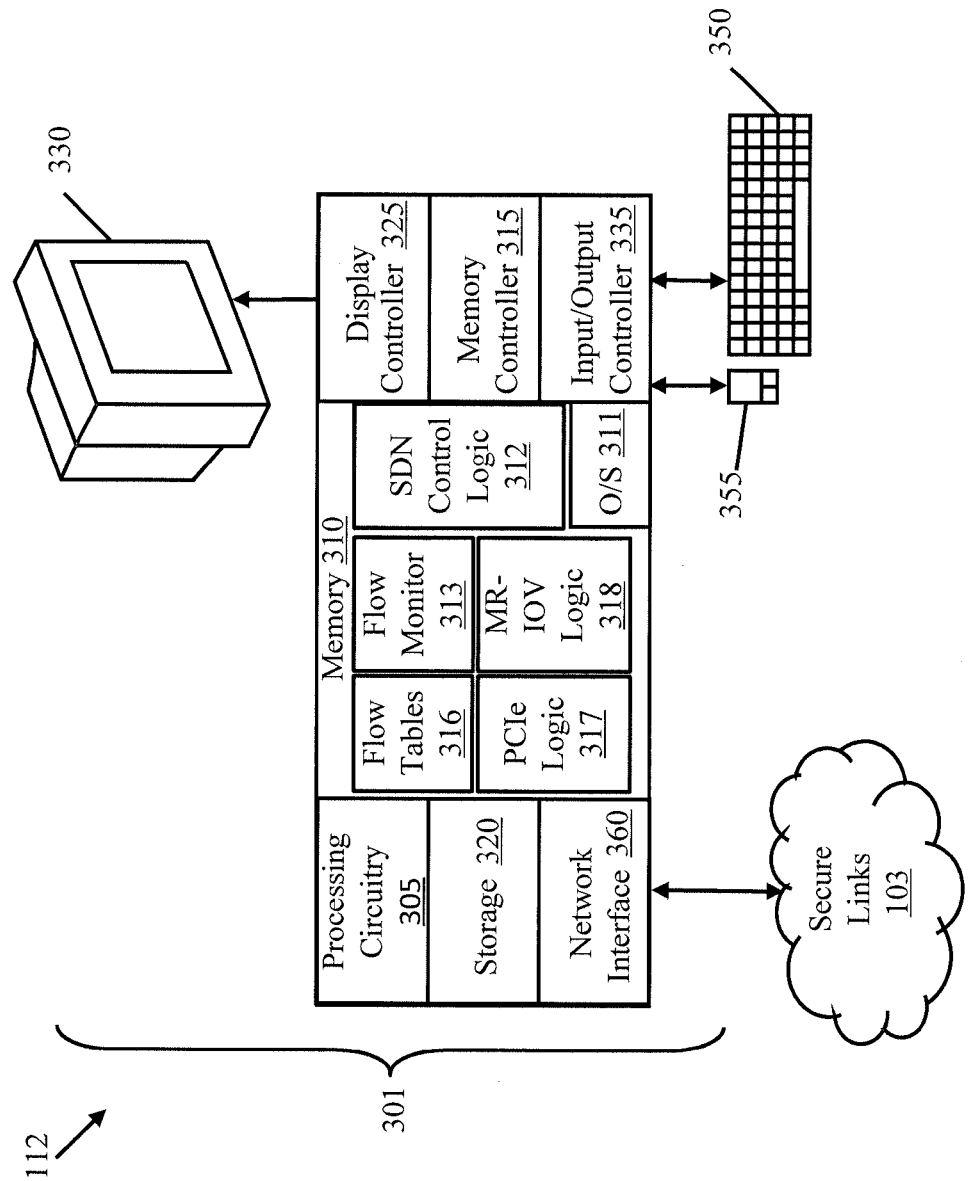
FIG. 3 depicts a block diagram of a SDN controller of the system of FIG. 1 in accordance with an embodiment.

FIG. 3 depicts a block diagram of the SDN controller 112 of FIG. 1 according to an embodiment. The SDN controller 112 can be embodied in any type of processing system and is depicted embodied in a general-purpose computer 301 in FIG. 3. The servers 102 and client systems 104 of FIG. 1 can also include similar computer elements as depicted in the computer 301 of FIG. 3.

In an exemplary embodiment, in terms of hardware architecture, as shown in FIG. 3, the computer 301 includes processing circuitry 305 and memory 310 coupled to a memory controller 315, and an input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the computer 301 may include address, control, and/or data connections to enable appropriate communications among the aforementioned components.

In an exemplary embodiment, a conventional keyboard 350 and mouse 355 or similar devices can be coupled to the input/output controller 335. Alternatively, input may be received via a touch-sensitive or motion sensitive interface (not depicted). The computer 301 can further include a display controller 325 coupled to a display 330.

The processing circuitry 305 is a hardware device for executing software, particularly software stored in storage 320, such as cache storage, or memory 310. The processing circuitry 305 can be any custom made or commercially available computer processor, a central processing unit (CPU), an auxiliary processor among several processors associated with the computer 301, a semiconductor-based microprocessor (in the form of a microchip or chip set), a macro-processor, or generally any device for executing instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), disk, hard disk drive, diskette, cartridge, cassette or the like, etc.). Moreover, the memory 310 may incorporate electronic, magnetic, optical, and/or other types of storage media. Accordingly, the memory 310 is an example of a tangible computer readable storage medium upon which instructions executable by the processing circuitry 305 may be embodied as a computer program product. The memory 310 can have a distributed architecture, where various components are situated remote from one another, but can be accessed by the processing circuitry 305.

The instructions in memory 310 may include one or more separate programs, each of which comprises an ordered listing of executable instructions for implementing logical functions. In the example of FIG. 3, the instructions in the memory 310 include a suitable operating system (OS) 311, SDN control logic 312, and a flow monitor 313. The operating system 311 essentially controls the execution of other computer programs and provides scheduling, input-output control, file and data management, memory management, and communication control and related services. Although depicted separately, the SDN control logic 312 and flow monitor 313 can be combined or further subdivided. When the computer 301 is in operation, the processing circuitry 305 is configured to execute instructions stored within the memory 310, to communicate data to and from the memory 310, and to generally control operations of the computer 301 pursuant to the instructions.

In an exemplary embodiment, the computer 301 can further include a network interface 360 for coupling to the secure links 103 of the network 101 of FIG. 1. The network interface 360 and components of the network 101 of FIG. 1 can be configured by the SDN control logic 312 according to flow tables 316. The flow tables 316 can be populated, or augmented, by PCIe logic 317 and/or MR-IOV logic 318. The PCIe logic 317 can include computer instructions that are used to identify data packets that contain PCIe packets, to determine actions to take for PCIe packets, and/or to aid in initiating a virtual tunnel. Similarly, the MR-IOV logic 318 can include computer instructions that are used to identify data packets that contain MR-IOV packets, to determine actions to take for MR-IOV packets, and/or to aid in initiating a virtual tunnel.

Figure 4:
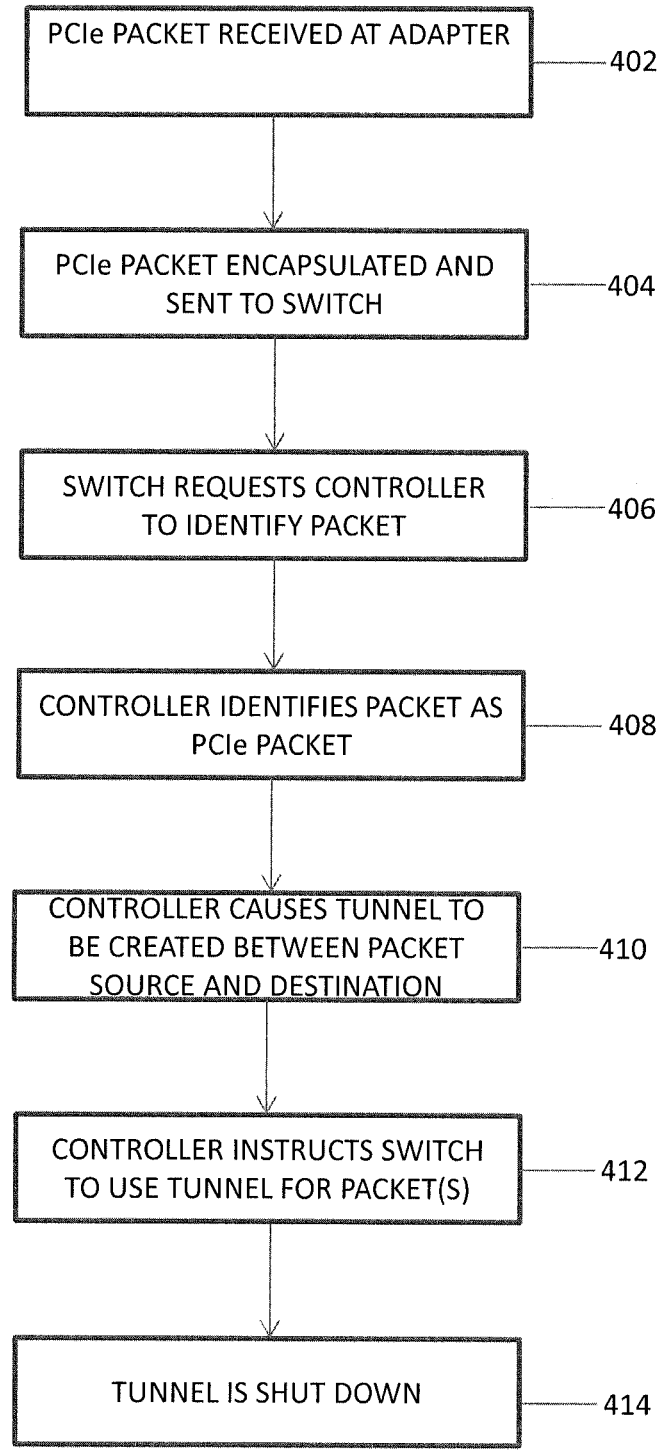
FIG. 4 depicts a process flow for performing tunneling in accordance with an embodiment.

Turning now to FIG. 4, a process flow for performing tunneling in accordance with an embodiment is generally shown. The process is described in in reference to FIGS. 1-3 and can be implemented by the system 100 of FIG. 1. At block 402, a source server 102 sends a PCIe packet to an adapter, such as a network interface controller (NIC). The adapter can be dedicated to the source server 102 transmitting the PCIe packet, or the adapter can be shared by the source server 102 and one or more additional servers 102. In addition, the adapter can be housed in the same physical hardware with the source server 102 or alternatively, the adapter can be located in physical hardware that is external to the source server 102. In an embodiment, the adapter supports PCIe packets. At block 404, the adapter encapsulates the PCIe packet and transmits the encapsulated PCIe packet, as an Ethernet packet, to a switch 106 in the network. The encapsulation can include creating a data packet by adding a header to the received data packet and then appending the contents of the received data packet to the header. The header can include a flag or other manner of identifying the packet as a PCIe packet. In an alternate embodiment, the processing in block 404 is performed at the switch 106 by switch logic 202.

In an alternate embodiment, the PCIe packet is not encapsulated. Instead PCIe packets are transmitted directly across the network to a second adapter capable of receiving unencapsulated PCIe data. In this embodiment, the network controller would be programmed with the information that unencapsulated PCIe traffic was being transmitted, and the controller would create a path from the source to the destination which avoids any intermediate devices not capable of handling unencapsulated PCIe packets. If no such path exists, the network controller would inform the NIC at the source server that it is unable to create a suitable transmission path.

The switch 106 receives the encapsulated PCIe packet at block 406 and attempts to identify a flow specified by the packet by accessing a flow table 206 located on the switch 106. In an embodiment, the switch 106 attempts to match an entry in the flow table 206 based on at least one of: contents of the header, a source of the data packet, a destination of the data packet, an IP address, and a machine access code (MAC) address of the packet. In an embodiment, the switch 106 doesn't recognize the flow and the switch 106 sends a request to identify the data packet to the SDN controller 112. At block 408, the SDN controller 112 receives the request from the switch 106. The SDN controller 112 logic identifies the packet as a PCIe packet based on the flag or other PCIe identifier in the packet header. In an embodiment, the identifying is performed by the PCIe logic 317 in the SDN controller 112 which can compare contents of the packet header with contents of the flow tables 316. The SDN controller 112 can verify that a destination server 102 specified by the PCIe packet, supports PCIe packets. Once the SDN controller 112 has determined that the destination server is PCIe compatible, block 410 is performed and the SDN controller 112 causes a virtual tunnel to be created from a switch 106 associated with the source server 102 to a switch 106 associated with the destination server 102. In an embodiment, the SDN controller 112 sends a command to the switch 106 to create the virtual tunnel and the switch 106 creates the virtual tunnel based on the command from the SDN controller. In an embodiment, the virtual tunnel is a virtual private network (VPN). The use of a virtual tunnel can allow PCIe messages to be sent back and forth between the source and destination servers 102 with a low latency.

At block 412, the SDN controller 112 instructs the switch 106 to use the virtual tunnel for the data packet and any subsequent data packets with the same flow characteristics. In an embodiment, the virtual tunnel is left open for data packet transmissions as long as a specified threshold of use, or flow rate, is occurring on the tunnel. Once the virtual tunnel is created, the encapsulated data packets are treated in the same manner as Ethernet data packets. At block 414, when the specified threshold of use has not occurred (e.g., within a specified time period), the virtual tunnel is shut down.

In an embodiment, multiple virtual tunnels are set up by the SDN controller 112 to facilitate, for example: unicasts, multicasts, and broadcasts of PCIe data packets.

In an alternate embodiment, at block 410, once the SDN controller 112 has determined that the destination server is PCIe compatible, the packet is sent as an Ethernet packet to the destination server 102 where it is un-encapsulated.

MR-IOV and single-root IOV (SR-IOV) techniques can be used in SDN to help offload management functions from a server to an adapter, such as a NIC. This can result in cycles being freed up on a server 102. In addition, MR-IOV and SR-IOV techniques can also be used to pool resources between servers 102. This can result in increased utilization of network resources.

Figure 5:
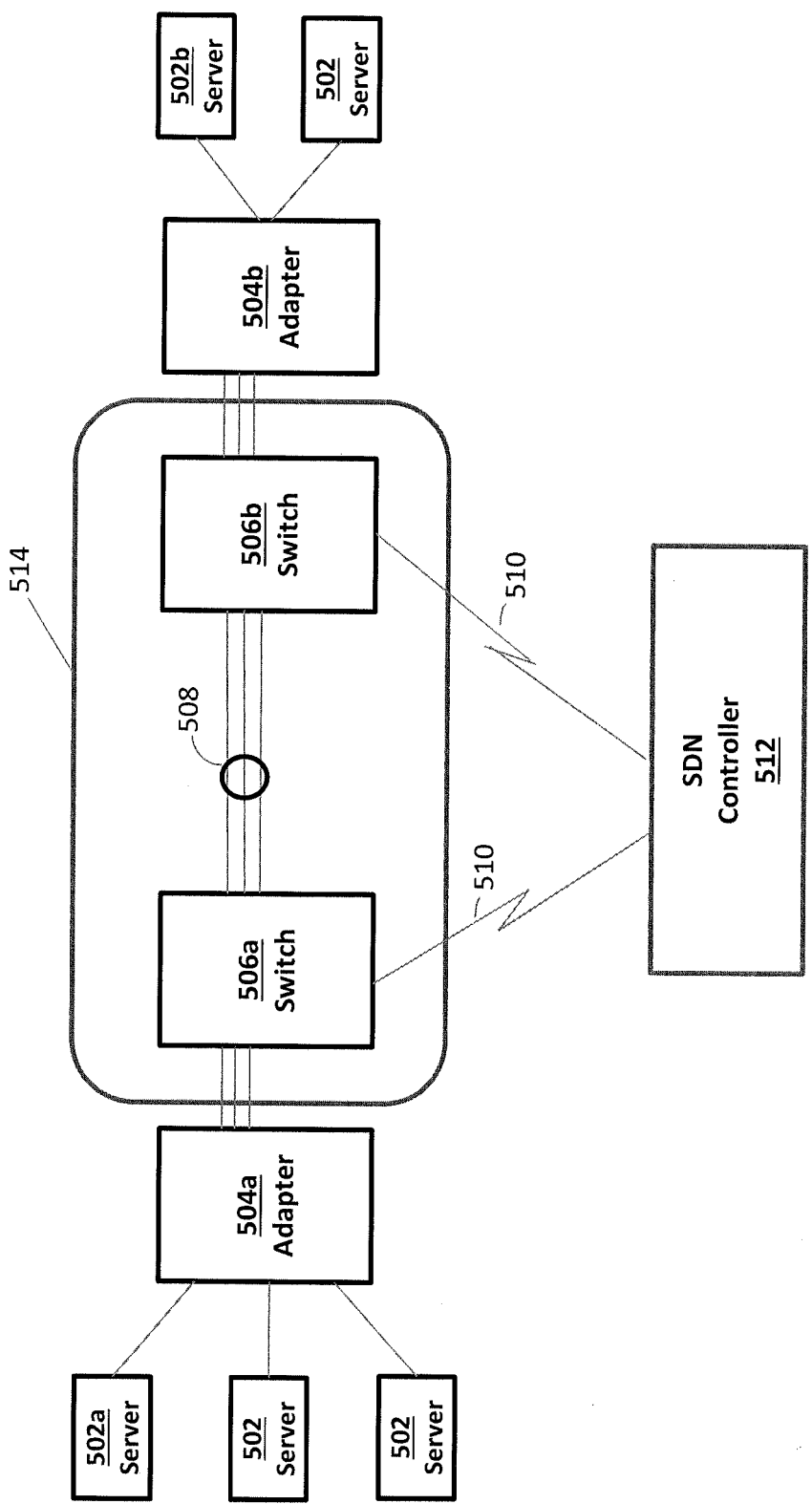
FIG. 5 depicts a system that includes a tunnel for transmitting multi-root I/O virtualization (MR-IOV) packets in accordance with an embodiment.

FIG. 5 depicts a system that includes a virtual tunnel for transmitting MR-IOV packets in accordance with an embodiment. Shown in FIG. 5, are a source server 502a, a destination server 502b and one or more other servers 502. Three servers 502 share source adapter 504a and two servers 502 share destination adapter 504b. The source adapter 504a binds three links 508 (out of three or more links 508 connected to the source adapter 504a) together and connects to source switch 506a. The source switch 506a and the destination switch 506b are shown as being connected to each other, however, they may be connected via one or more intermediary switches.

The processing of MR-IOV packets is similar to the processing shown in FIG. 4 for PCIe packets. The source adapter 504a identifies a data packet as a MR-IOV packet and encapsulates the MR-IOV packet for transmission as an Ethernet packet, to a source switch 506a in the network. The encapsulation can include adding a header that identifies the packet as an MR-IOV packet to the SDN controller 512. In an alternate embodiment, the encapsulating is performed by switch logic at the source switch 506a. The source switch 506a attempts to identify a flow associated with the packet, and if it cannot identify the flow (e.g., based on the header), it queries the SDN controller 512 for a flow identification. The SDN controller 512 identifies the packet as a MR-IOV packet (e.g., based on the header), verifies that the destination adapter 504b supports MR-IOV packets, and causes a tunnel 514 to be created from the source adapter 504a to the destination adapter 504b. An adapter capable of supporting MR-IOV packets will be able to generate and recognize the traffic flow bindings and associations created by an MR-IOV environment (i.e. binding together multiple physical traffic flows from different servers into a single logical flow). The SDN controller 512 instructs the source switch 506a to use the tunnel 514 for the data packet.

At block 412, the SDN controller 112 instructs the switch 106 to use the tunnel for the data packet and any other data packets with the same flow characteristics. In an embodiment, the tunnel is left open for data packet transmissions as long as a specified threshold of use is occurring on the tunnel. Once the tunnel is created, the encapsulated data packets are treated in the same manner as Ethernet data packets. At block 414, when the specified threshold of use has not occurred (e.g., within a specified time period), the tunnel is shut down.

Technical effects and benefits include the ability to transmit and control PCIe and MR-IOV traffic in a SDN network.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for software-defined networking (SDN) in a computer network, the method comprising:
   receiving, at a SDN controller in the computer network, a request from a requestor to identify a flow of a data packet from a source network device to a destination network device in the computer network, the data packet including a data packet header;
   determining, by the SDN controller, based on the data packet header, that the data packet includes one of a peripheral component internet express (PCIe) data packet and a multi-root input/output (MR-IOV) data packet, and that the flow of the data packet requires a virtual tunnel between the source network device and the destination network device;
   initiating, by the SDN controller, creation of the virtual tunnel in the computer network;
   instructing, by the SDN controller, the requestor to send the packet from the source network device to the destination network device via the virtual tunnel; and
   instructing the requestor to use the virtual tunnel for sending subsequent packets having the same flow and received prior to the virtual tunnel being shut down.

2. The method of claim 1, wherein the PCIe data packet is encapsulated in the data packet.

3. The method of claim 1, wherein the MR-IOV data packet is encapsulated in the data packet.

4. The method of claim 3, wherein the virtual tunnel includes a plurality of links that are bound together and used in parallel.

5. The method of claim 1, further comprising:
   monitoring utilization of the virtual tunnel; and
   shutting down the virtual tunnel based on the utilization dropping below a specified threshold.

6. The method of claim 1, wherein the data packet is an Ethernet data packet.

7. The method of claim 1, wherein the source network device and the destination network device are implemented by Ethernet switches.

8. The method of claim 1, wherein the computer network includes a converged enhanced Ethernet (CEE).

9. A system for software-defined networking (SDN) in a computer network, the system comprising:
a SDN controller; and
a memory coupled to the SDN controller, wherein instructions in the memory are configured to cause the SDN controller to:
receive a request from a requestor to identify a flow of a data packet from a source network device to a destination network device in the computer network, the data packet including a data packet header;
determine, based on the data packet header, that the data packet includes one of a peripheral component internet express (PCIe) data packet and a multi-root input/output (MR-IOV) data packet, and that the flow of the data packet requires a virtual tunnel between the source network device and the destination network device;
initiate creation of the virtual tunnel in the computer network;
instruct the requestor to send the packet from the source network device to the destination network device via the virtual tunnel; and
instruct the requestor to use the virtual tunnel for sending subsequent packets having the same flow and received prior to the virtual tunnel being shut down.

10. The system of claim 9, wherein the PCIe data packet is encapsulated in the data packet.

11. The system of claim 9, wherein the MR-IOV data packet is encapsulated in the data packet.

12. The system of claim 9, wherein the instructions are further configured to cause the SDN controller to:
monitor utilization of the virtual tunnel; and
shut down the virtual tunnel based on the utilization dropping below a specified threshold.

13. The system of claim 9, wherein the data packet is an Ethernet data packet.

14. The system of claim 9, wherein the source network device and the destination network device are implemented by Ethernet switches.

15. The system of claim 9, wherein the computer network includes a converged enhanced Ethernet (CEE).

16. A computer program product for software-defined networking (SDN) in a computer network, the computer program product comprising:
a tangible storage medium readable by a processing circuit and storing instructions for execution by the processing circuit for performing a method comprising:
receiving a request from a requestor to identify a flow of a data packet from a source network device to a destination network device in the computer network, the data packet including a data packet header;
determining, based on the data packet header, that the data packet includes one of a peripheral component internet express (PCIe) data packet and a multi-root input/output (MR-IOV) data packet, and that the flow of the data packet requires a virtual tunnel between the source network device and the destination network device;
initiating creation of the virtual tunnel in the computer network;
instructing the requestor to send the packet from the source network device to the destination network device via the virtual tunnel; and
instructing the requestor to use the virtual tunnel for sending subsequent packets having the same flow and received prior to the virtual tunnel being shut down.

17. The computer program product of claim 16, wherein the PCIe data packet is encapsulated in the data packet.

18. The computer program product of claim 16, wherein the MR-IOV data packet is encapsulated in the data packet.

19. The computer program product of claim 16, wherein the method further comprises:
monitoring utilization of the virtual tunnel; and
shutting down the virtual tunnel based on the utilization dropping below a specified threshold.

20. The computer program product of claim 16, wherein the computer network includes a converged enhanced Ethernet (CEE).

* * * * *